US010503495B2

(12) United States Patent
Kolhe et al.

(10) Patent No.: US 10,503,495 B2
(45) Date of Patent: Dec. 10, 2019

(54) COMPONENT MANAGEMENT PLATFORM

(71) Applicant: Accenture Global Solutions Limited, Dublin (IE)

(72) Inventors: Ashish Kolhe, Pune (IN); Dhanashree Dalal, Pune (IN); Parikshit Maniar, Bangalore (IN); Shridhar D. Rajgopalan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 114 days.

(21) Appl. No.: 15/714,282

(22) Filed: Sep. 25, 2017

(65) Prior Publication Data
US 2019/0042231 A1 Feb. 7, 2019

(30) Foreign Application Priority Data

Aug. 2, 2017 (IN) .............................. 201711027485

(51) Int. Cl.
*G06F 9/44* (2018.01)
*G06F 8/71* (2018.01)
(Continued)

(52) U.S. Cl.
CPC .................. *G06F 8/71* (2013.01); *G06F 8/36* (2013.01); *G06F 8/65* (2013.01); *G06F 8/77* (2013.01);
(Continued)

(58) Field of Classification Search
CPC ..... G06F 8/65; G06F 8/71; G06F 8/73; G06F 8/77; G06F 8/36; G06F 11/3692
See application file for complete search history.

(56) References Cited

U.S. PATENT DOCUMENTS 6,009,274 A * 12/1999 Fletcher .................... G06F 8/65
709/217
6,049,671 A * 4/2000 Slivka ...................... G06F 8/61
717/173

(Continued)

FOREIGN PATENT DOCUMENTS

EP 2784665 1/2014

OTHER PUBLICATIONS

SourceForge.net [online], "Discover the New SourceForge" Available on or before Feb. 13, 2011 via Internet Archive: Wayback Machine, [Retrieved on Nov. 26, 2018], Retrieved from: URL<https://sourceforge.net/create/>, 5 pages.

(Continued)

*Primary Examiner* — Hiren P Patel
(74) *Attorney, Agent, or Firm* — Fish & Richardson P.C.

(57) ABSTRACT

A component management platform includes a component library that stores software components to be incorporated into applications, such as components that have been optimized for efficient performance, reliability, and/or other aspects. The platform also provides a workspace that is accessed to create an application that includes component(s) stored in the component library. In some instances, a developer modifies component when incorporating the component into their application. The platform enables the developer to upload the modified version of the component, which is stored in the component library and published, through the platform, to enable others to incorporate the modified version of the component into their application projects. In some implementations, the modified version is tested for backward compatibility with previous versions of the component, and to verify that the modified version does not include any bugs.

18 Claims, 9 Drawing Sheets

(51) Int. Cl.
*G06F 8/65* (2018.01)
*G06F 11/36* (2006.01)
*G06F 8/77* (2018.01)
*G06F 8/36* (2018.01)
*G06F 16/22* (2019.01)

(52) U.S. Cl.
CPC ...... *G06F 11/3692* (2013.01); *G06F 16/2246* (2019.01)

(56) References Cited

U.S. PATENT DOCUMENTS

| | | | | |
|---|---|---|---|---|
| 7,016,944 | B1* | 3/2006 | Meyer | G06F 8/65 709/218 |
| 7,080,371 | B1* | 7/2006 | Arnaiz | G06F 8/65 717/168 |
| 7,096,464 | B1* | 8/2006 | Weinmann | G06F 8/65 717/168 |
| 7,506,337 | B2* | 3/2009 | Iyer | G06F 8/71 713/1 |
| 7,953,764 | B2* | 5/2011 | Baffier | G06F 8/61 707/802 |
| 8,230,415 | B1* | 7/2012 | Thomas | G06F 21/57 717/168 |
| 8,856,724 | B2* | 10/2014 | Somani | G06F 8/36 717/101 |
| 10,114,637 | B1* | 10/2018 | Willson | G06F 8/71 |
| 10,263,803 | B2* | 4/2019 | Ansari | H04L 12/2803 |
| 10,387,141 | B2* | 8/2019 | Mere | G06F 8/654 |
| 2004/0060044 | A1* | 3/2004 | Das | G06F 8/65 717/171 |
| 2004/0117785 | A1* | 6/2004 | Kincaid | H04W 8/20 717/170 |
| 2005/0132349 | A1* | 6/2005 | Roberts | G06F 8/65 717/168 |
| 2007/0118530 | A1* | 5/2007 | Chow | G06F 8/65 |
| 2007/0149214 | A1* | 6/2007 | Walsh | H04L 12/1859 455/456.1 |
| 2007/0234291 | A1 | 10/2007 | Ronen et al. | |
| 2010/0235513 | A1* | 9/2010 | Baffier | G06F 8/61 709/226 |
| 2010/0287529 | A1* | 11/2010 | Costa | G06F 8/34 717/105 |
| 2012/0324417 | A1* | 12/2012 | Somani | G06F 8/36 717/101 |
| 2013/0067599 | A1* | 3/2013 | Raje | G06F 8/65 726/29 |
| 2014/0282476 | A1* | 9/2014 | Ciudad | G06F 8/65 717/171 |
| 2014/0297592 | A1* | 10/2014 | Ohtake | G06F 8/71 707/638 |
| 2015/0007157 | A1* | 1/2015 | Park | G06F 8/65 717/170 |
| 2015/0356207 | A1* | 12/2015 | Reitman | G06F 17/5095 703/1 |
| 2016/0132310 | A1* | 5/2016 | Koushik | G06F 8/61 717/176 |
| 2016/0179498 | A1* | 6/2016 | Das | G06F 8/65 717/171 |
| 2018/0302494 | A1* | 10/2018 | Jain | H04L 67/34 |
| 2018/0307480 | A1* | 10/2018 | Doyle | G06F 8/658 |

OTHER PUBLICATIONS

Wiki.eclipse.org [online], "Platform", Mar. 24, 2016, [retrieved on Nov. 26, 2018], retrieved from; <https://wiki.eclipse.org/Platform>, 1 page.

European Search Report and written opinion in European application 18184659.3, dated Dec. 6, 2018, 6 pages.

* cited by examiner

COMPONENT MANAGEMENT PLATFORM

CROSS-REFERENCE TO RELATED APPLICATION

This application claims priority to Indian Patent Application No. 201711027485, filed on Aug. 2, 2017, entitled "COMPONENT MANAGEMENT PLATFORM," the entirety of which is hereby incorporated by reference.

BACKGROUND

Many software developers use an integrated development environment (IDE) to write source code and build (e.g., compile and link) the code to generate an executable computer program. Traditional IDEs can include a set of different, and often incompatible tools (e.g., generators, plug-ins) that fail to support an integrated and standardized application development process. Moreover, traditional IDEs may not be designed to support a development community, and may fail to provide a feedback mechanism for sharing and improving code within a community, which may lead to the creation of buggy or otherwise low quality applications.

SUMMARY

Implementations of the present disclosure are generally directed to a platform for managing software component development. More particularly, implementations of the present disclosure are directed to a platform that provides software components that can be incorporated into applications, receives updated versions of the components, and manages the evolution of component versions to facilitate rapid development of quality-controlled applications that include the managed components.

In general, innovative aspects of the subject matter described in this specification can be embodied in methods that include actions of: accessing a component library that stores at least one version of each of a plurality of software components; publishing a first version of a software component from the component library to a plurality of workspaces that provide a software development environment, the first version being included in at least one application that is created using at least one of the plurality of workspaces; receiving a second version of the software component that includes at least one modification to the first version; and performing at least one test to verify that the second version is compatible with the first version and, based on verifying that the second version is compatible with the first version: storing the second version in the component library; publishing the second version from the component library to the plurality of workspaces; and updating the at least one application to include the second version.

These and other implementations can each optionally include one or more of the following innovative features: updating the at least one application to include the second version includes automatically updating the at least one application to include the second version, based at least partly on determining that the at least one application is registered to receive updates to the software component; updating the at least one application to include the second version includes automatically updating the at least one application to include the second version, based at least partly on determining that at least a threshold number of applications have been updated to include the second version; updating the at least one application to include the second version includes sending a notification indicating that the second version of the software component is available in the component library, and updating the at least one application to include the second version, based at least partly on receiving an update request; publishing a first version of a software component from the component library to the plurality of workspaces includes providing, for presentation in the plurality of workspaces, an adoption statistic that indicates a number of applications that have been previously created in the plurality of workspaces to include the first version of the software component; updating the at least one application includes sending a notification to at least one user associated with the at least one application, the notification describing the at least one modification made to the first version to generate the second version; the actions further include creating a tree structure that stores information describing available versions of the software component, including the first version and the second version, wherein the tree structure includes a plurality of nodes that each corresponds to a respective version of the software component; the actions further include reducing a width of the tree structure by merging at least two of the available versions of the software component, the merging based at least partly on a relative weight of the at least two available versions; and/or the actions further include reducing a width of the tree structure by indicating that at least one of the available versions of the software component is deprecated, based at least partly on a relative weight of the at least one available version compared to other available versions of the software component.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and improvements over traditional systems. The platform, provided by the implementations described herein, facilitates rapid development of applications, such as front end applications, using modelled components. The platform provides a mechanism and workflow to improve the quality of the modelled components, through updates provided by users (e.g., developers) who can use the platform to incorporate versions of the modelled components in applications and modify the components to accommodate various solutions. The modified components may be published in a component library to be available for use in subsequently created applications, and may also be redeployed to upgrade applications that include a previous version of the component. Thus, implementations provide a platform to support the evolution of components for improved component quality, resulting in component reusability, standardization of code, and improved quality of code. The platform enables cross-leveraging of reusable components across one or more enterprises, and/or within one or more communities of developers, to enable substantially continuous and directed evolution of the components managed through the platform. The platform facilitates application development using the modelled components, and enables improvement to the modelled components when put into use, and redeployment of improved modelled components. Implementations provide a saving in development time, expense, and personnel usage, through use of reusable and modeled components, resulting in improved quality due to process standardization, automated review, and guided development with reduced expertise needed for development and reviews. Accordingly, implementations make more efficient use of processing capacity, active memory, storage space, network capacity, and/or other computing resources compared to traditional development environments.

The platform also enables an active development community (e.g., at the enterprise level) of members that can use the platform to download components for inclusion in their development projects, upload modified (e.g., improved) versions of the components, and provide other feedback regarding components. In this way, the platform provides an environment for collaboration to grow and evolve a code base of components that facilitates more rapid development of higher quality applications for various purposes.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
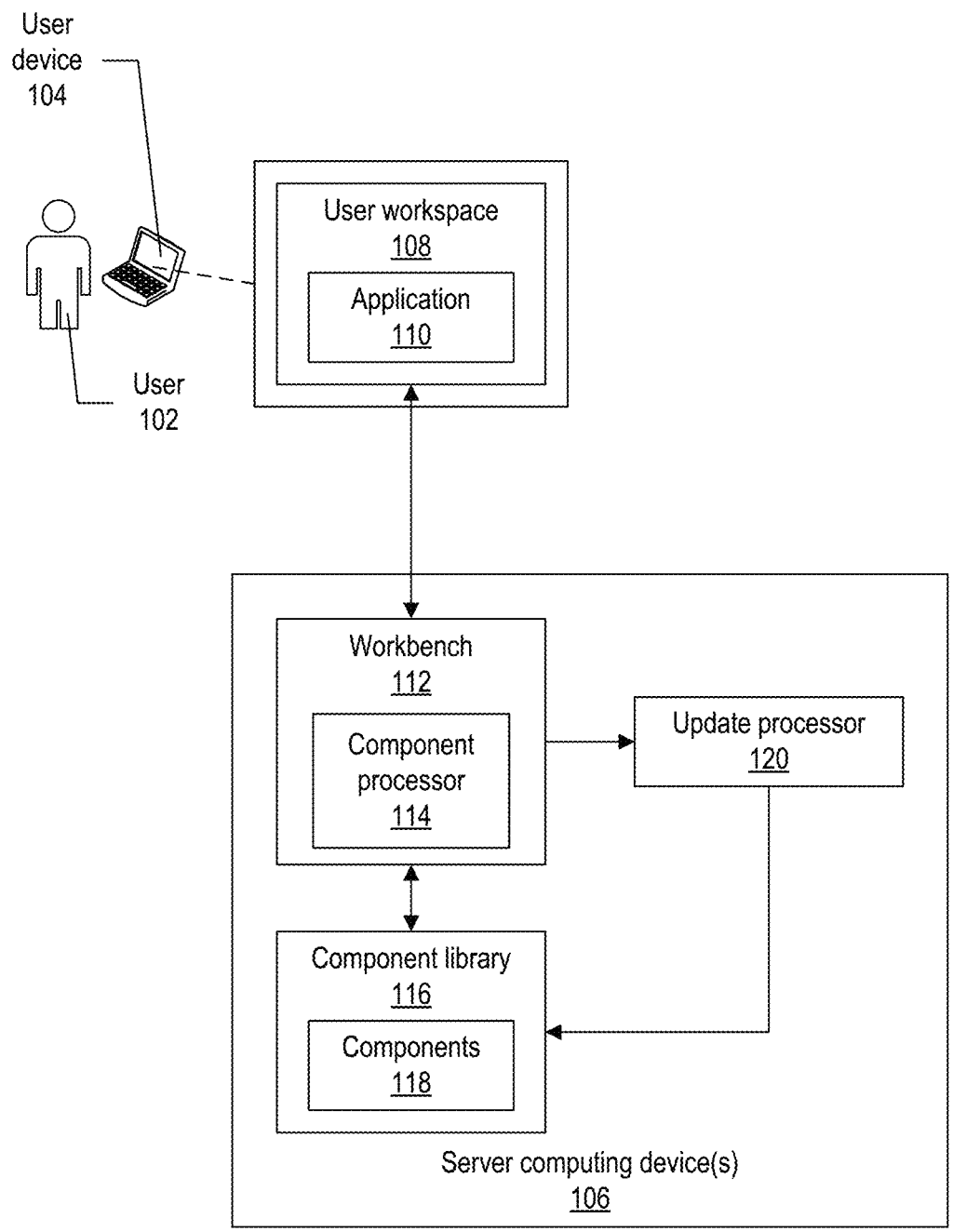
FIG. 1 depicts an example system for software component management, according to implementations of the present disclosure.

Implementations of the present disclosure are directed to systems, devices, methods, and computer-readable media for a software component management platform. The platform includes a component library that stores software components that can be incorporated into applications. In some implementations, the software components include modelled components that have been optimized for efficient performance, reliability, and/or other aspects. The platform also provides a user workspace and/or workbench that a user (e.g., a developer) can use to create an application. The user may create an application that includes one or more of the modelled components stored in the component library. In some instances, a developer may make one or more modifications to a modelled component when incorporating the component into their application. The platform enables the developer to upload the modified version of the modelled component. The modified version is then stored in the component library and published to other users of the platform, to enable others to incorporate the modified version of the component into their application projects. In some implementations, the modified version is tested for backward compatibility with previous versions of the component, and to verify that the modified version does not include any bugs. The modified version can be published and made available to other users based on verification of backward compatibility and lack of problems.

In some implementations, the platform may track the various versions of a component in a data structure that is a hierarchical tree structure. The tree structure may store information regarding any suitable number of versions of a component, created through any suitable number of component modifications by users of the platform. In some implementations, the tree for a component may be periodically examined for possible pruning, in which various versions may be merged into a single version, and/or various versions may be deprecated. Such pruning manages the size of the tree to ensure efficient traversal, and is described further below.

In some instances, the platform may be used to develop applications that are front end applications, such as applications that have end-user facing features such as user interface (UI) elements. Such UI elements may include visual elements, such as graphical UI (GUI) elements that display information to the end-user. The UI elements may also include elements that present information through other means, such as through audio output and/or haptic output. The UI elements may also include various types of elements (e.g., controls) that receive input from the end-user, such as textual data, commands that are provided by way of gestures (e.g., mouse clicks, taps, selections, etc.) made to the UI elements, and/or other types of input. The platform may also be used to develop applications that are not front end applications, and/or that include features that are not end-user facing. For example, the platform may be used to develop applications that are libraries, back end utilities and/or services, middleware (e.g., business layer) software, persistence layer (e.g., data access layer) software, application programming interfaces (APIs), daemons, device drivers, and so forth. Accordingly, although examples herein may describe the use of the platform to develop front end applications, implementations can be used to development any suitable type of software application, library, or other type of software module.

As used herein, a software component (also referred to as a component) may be any type of software that provides any suitable type of functionality when executed. A component may be a front end component, that includes features to output data to an end-user and/or receive data that is input by an end-user. A component may be a back end component, and/or non-front end component, that may interact with other processes running locally and/or remotely. A component may perform any suitable number and type of operations. Implementations support the use of components that are written in, or otherwise described using, any suitable programming language, including compiled languages, interpreted languages, scripting languages, and so forth.

Currently available application development environments do not provide community learning-driven directed evolution of components. The platform described herein provides an ecosystem in which components are able to evolve in response to community learning, and the modified and/or improved components are provided, through the platform, back to the community of developers for inclusion in subsequent applications. Moreover, traditional development environments often provide a set of different, and often incompatible tools (e.g., generators, plug-ins), and are accordingly unable to provide an integrated and standardized application development process. Traditional environments may also lack a feedback and/or improvement mechanism for receiving and publishing updates to components based on development within the user community, and lack the ability to incorporate and/or push community learning, experience, and/or community-devised best practices for improved software development.

The implementations described herein overcome these shortcomings of previously available solutions. In addition to the community-driven component evolution features described herein, the platform also includes features that facilitate one or more of the following: project setup, component and/or code generation, language assistance (e.g., intelli-sense), custom snippets, quality checks, build tools, a centralized components library, guided evolution, feedback mechanism, and/or notification and component updates, as described further below.

FIG. 1 depicts an example system for software component management, according to implementations of the present disclosure. The system can also be described as a platform. As shown in the example of FIG. 1, a user 102 (e.g., a software developer or other type of user) operates a user device 104, which may be any suitable type of computing device. The user device 104 can execute a user workspace 108 that provides a software development environment. The user 102 can use the user workspace 108 to create an application 110 within an application project. The user device 104 communicates, over one or more networks, with one or more server computing devices 106 that provide the other aspects of the development platform. The server computing device 106 can include any appropriate number and type of computing devices.

In some implementations, the server computing device(s) 106 execute a workbench 112, which may include a component processor 114. The server computing device(s) 106 also execute an update processor 120. In some implementations, the server computing device(s) 106 include (e.g., in local memory) a component library 116 that stores one or more components 118 (e.g., modelled components and/or reusable components). In some implementations, the component library 116 is external to the server computing device(s) 106, and accessible over one or more networks. The workbench 112 may include software such as language processor(s), linter(s), compiler(s), debugger(s), and so forth, to enable the user 102 to create the application 110. Through the workspace 108, the user 102 can view a set of components 118 included in the component library 116, and select one or more components 118 to include in the application. Use of the modelled components, which have been optimized for reliability and performance, enables rapid development of applications that are substantially reliable, high-performance, and/or bug-free.

The user 102 may also modify the modelled components retrieved from the component library, e.g., to customize such components for use in their application 110. In such instances, the update processor 120 can retrieve the modified versions of the component(s) and store them in the component library 116, to be available for use by other users in other applications developed through the platform. In this way, implementations facilitate the providing of feedback and/or improvements to the modelled components, and incorporate the feedback and/or improvements into the component library for use by the user community. The platform enables the creation and publication of reusable components, that may be reused in a various of applications of various types, thus reducing the time and effort to develop new applications. The improved and/or otherwise modified components are pushed to the user community, leading to improved quality of applications through promulgation of best practices and/or community knowledge and experience. Previously available development solutions lack the ability to provide component modifications to a larger community, and/or may exhibit long update times in which the updates can include bugs and/or bad practices through lack of quality control in the component updates. Through the community-based learning and improvement mechanism provided by the implementations described herein, the platform addresses these and other shortcomings of previously available solutions, resulting in improved application component quality.

Figure 2:
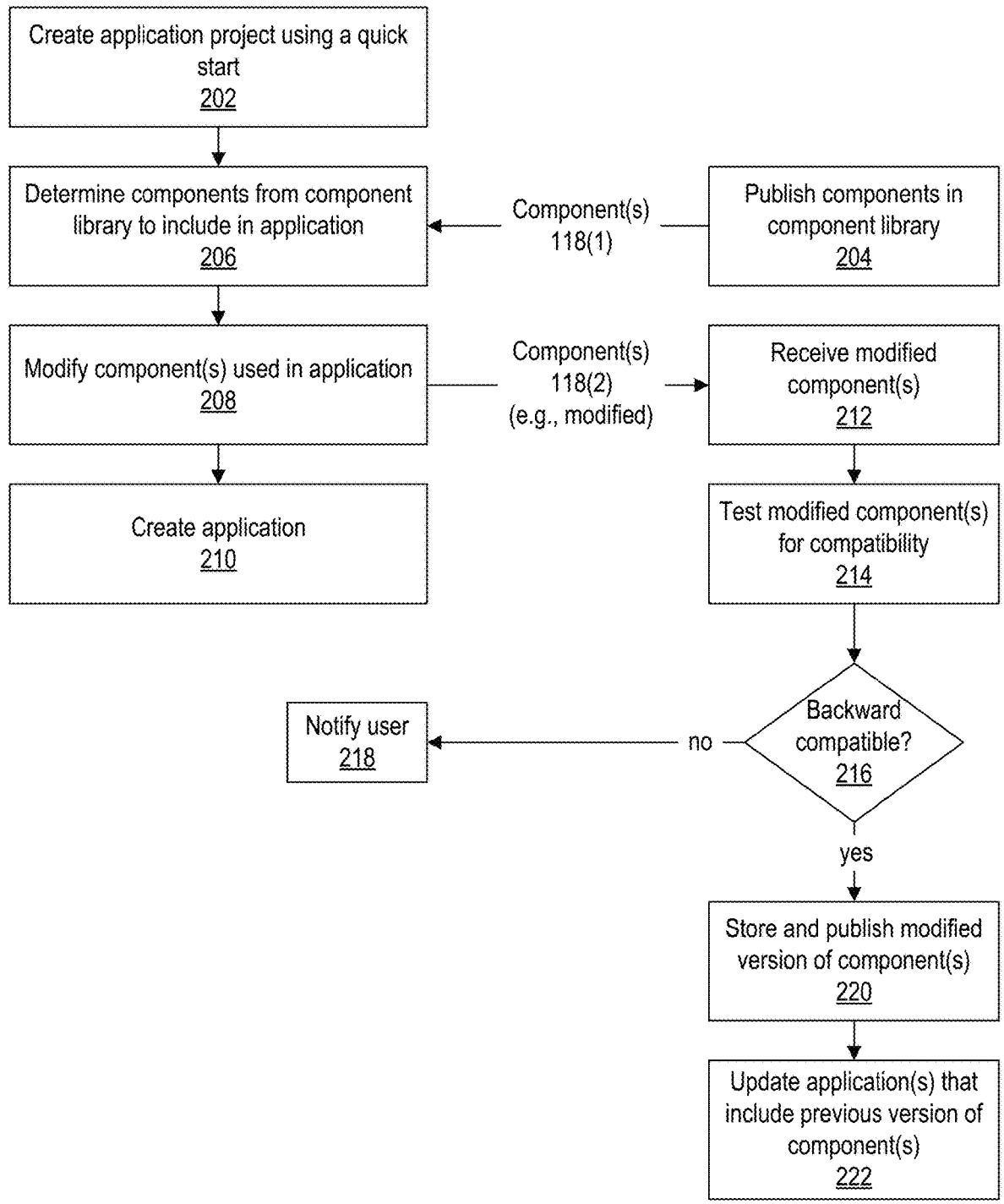
FIG. 2 depicts a flow diagram of an example process for software component management, according to implementations of the present disclosure.

FIG. 2 depicts a flow diagram of an example process for software component management, according to implementations of the present disclosure. Operations of the process can be performed by one or more of the user workspace 108, the workbench 112, the component processor 114, the update processor 120, and/or other software module(s) executing on the server computing device(s) 106, the user device 104, or elsewhere.

An application 110 is created (202) in the workspace. In some implementations, the application is created using a quick start that is provided through the platform. Components 118(1) in the component library are published (204) to be available for inclusion in an application that is part of the application project. One more components are determined (206), from the component library, to include in the application. In some instances, one or more of the components may be modified and/or customized (208) by the user for inclusion in the application. The application, including the modified and/or unmodified components is created (210) (e.g., built).

If any components have been modified by the user, the modified components 118(2) may be received (212) by the update processor 120. In some instances, the modified components may be received as updated code (e.g., source code and/or binary code), and may include comments or other description of the changes made in this version of the component. The received modified components may be built into executable code, if not already executable, and tested (214) to ensure that the new version of each component is backward compatible with previous version(s), e.g., to ensure that the new version will not break the functionality of an application that included a previous version of the component. Such testing may include unit testing, functional testing, performance testing (e.g., to check whether the new version is within a range of acceptable performance), usability testing, and/or other types of testing. If the new version is determined (216) to be not backward compatible, or otherwise exhibits problems, the user who made the modifications may be notified (218) of the lack of backward compatibility and/or other identified issues. If the new version if determined (216) to be backward compatible and does not exhibit other problems (or if the issues identified are determined to be acceptable), the new version of the component is stored in the component library (220), and published to enable the user community to use the new version.

In some instances, one or more existing applications that included a previous version of the component may be updated (222) to incorporate the new version of the component. Such updates are described further below, and may be performed automatically and/or based on a request from a user that is an owner of the applications that are candidates for updates.

In some implementations, the platform provides at least the following features: application project creation using modelled quick starts, creation of application components based on modelled components (e.g., through user modification of modelled components), customization of modelled components and submission of the modified (e.g., improved) components to the component library, centralized hosting of modelled and/or reusable components, and pushing of the updated components to users and/or applications that include previous versions.

In traditional development environments, starting a project from scratch is a cumbersome process which require skill and knowledge, as well as considerable up-front effort. The platform provides multiple quick starts, and assists the user in making an informed decision regarding which quick start is best suited for the user's needs, given the type of application to be created. To recommend a quick start to the user, the platform may query the user to determine their preferences regarding languages, features, intended use, type of application, and so forth. One or more potential quick starts that satisfy the specified criteria may be recommended to the user. Quick start recommendations may also be based on adoption statistics regarding the available quick starts. For example, the platform may recommend a quick start that is the most popular (e.g., most frequently used) quick start among the user population of the platform, and that also satisfies the user's criteria.

In some implementations, a quick start includes a set of (e.g., modelled) components that are suitable for creating a particular type of application. The user may use the modelled components, and/or modify the component(s) as needed, to create the application. The user may also use the workspace to browse and/or search the component library for other components to incorporate into the application. The search may be based on search criteria such as type of component (e.g., UI components, utilities, services, etc.), technology characteristics of the component (e.g., programming language, supported execution environments, etc.), and/or other search criteria. In some implementations, the platform may recommend suitable components for use in the application. For example, the platform may collect statistics regarding how often component(s) have been used in applications (e.g., adoption frequency), information regarding performance and/or issues with the component(s), and so forth. The platform may recommend component(s) that are most frequently used and that satisfy the user's search criteria. In some implementations, the platform may recommend a particular version of a component to the user. For example, the most recent version and/or the most frequently used version may be recommended, among the available (e.g., non-deprecated) versions of a component in the component library.

Through the workspace, the user can incorporate a modelled component into their application, modify a modelled component for use in the application, and/or create a new component that is not based on a previously available modelled component. In the latter two cases, the modified and/or new component can be uploaded to the component library to be available for other users to incorporate into their applications. A modified and/or new component may be provided, to the update processor, with comments and/or other descriptive information describing the (e.g., new and/or altered) functionality of the component being provided. The uploaded component may be tested and published, based on a determination of backward compatibility, lack of bugs, and/or other quality criteria.

Figure 3A:
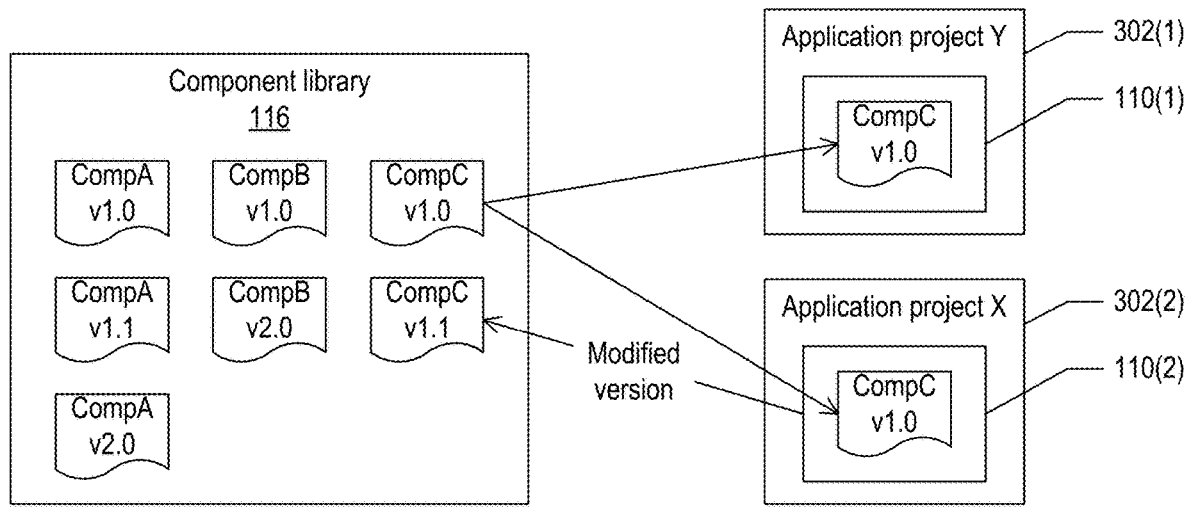
FIGS. 3A, 3B, and 3C depict examples of component use in applications, and component updates, according to implementations of the present disclosure.
Figure 3B:
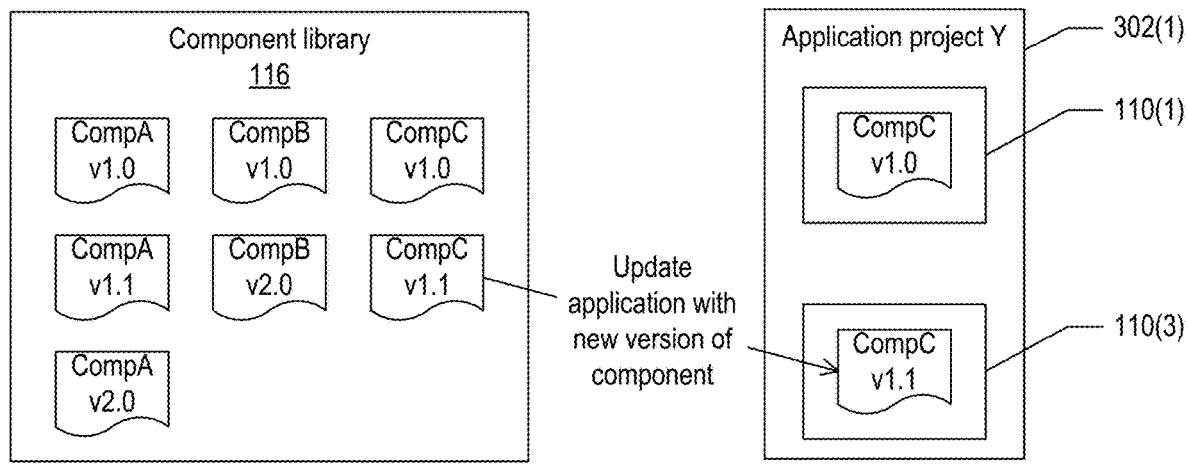
Figure 3C:
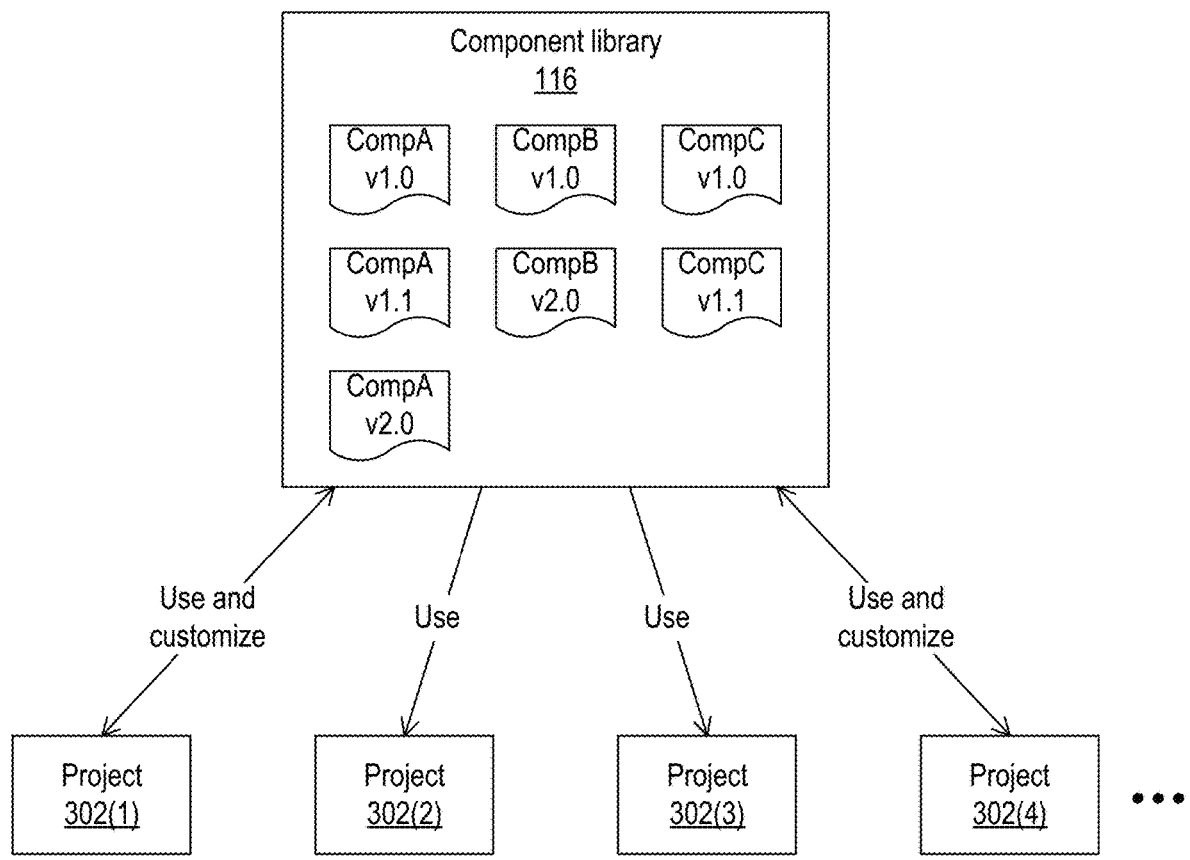

FIGS. 3A, 3B, and 3C depict examples of component use in applications, and component updates, according to implementations of the present disclosure. As shown in FIG. 3A, the component library 116 can include any suitable number of versions for each of one or more components. A particular (e.g., modelled) component may be incorporated into one or more applications of one or more application projects. In this example, a version 1.0 of a Component C (CompC) has been used to create two applications in Application project X and Application project Y. The user who is working on Application project X has made one or more modifications to CompC version 1.0, and the modified version has been uploaded to the component library as CompC version 1.1. Implementations support the use of any version numbering scheme, or some other format for indicating the versions of components.

As shown in FIG. 3B, because Application project Y includes an application 110(1) that incorporated CompC version 1.0, that application may be updated to include the new version of CompC version 1.1. In some implementations, the upgrade may occur if testing determines that the new version is backward compatible with the old version, such that incorporating the new version into the application does not break or otherwise introduce problems to the application. In this example, the Application project Y has been updated to include an updated version of the application 110(3), which includes the updated version 1.1 of CompC. In some instances, the update may be automatic based on the application having been subscribed to receive auto-updates. In some instances, the update may be in response to a notification, sent to a user associated with the Application project Y to notify the user that an updated version of CompC has been available in the component library.

As shown in the example of FIG. 3C, a component library may provide component versions to any suitable number of application projects that each include any suitable number of applications. The component versions may be provided for use in the applications, as shown for example projects 302(2) and 302(3). In some instances, the component versions may be provided for use in the applications and updated versions of the components may be provided to the component library for use by the broader user community, as shown for example projects 302(1) and 302(4).

In this way, implementations allow for the customization of modelled components, as well as the submission of these customized (e.g., improved) component versions to the component library for use within the community and for further feedback, modification, and/or improvement by community members. Implementations facilitate a guided and continuous evolution of the modelled components being used for application development. Implementations also facilitate the versioning of the modelled components, and the adoption and/or upgrade of components based on the versioning. Modelled components may be developed, and in some instances may evolve, to address various application features such as security, logging, and so forth. A reusable component can be a modelled component. A collection of modelled components it may address one or more particular aspects or features. The platform may not differentiate between modelled and reusable components with respect to component hosting, updating, propelling, versioning, or other stages of component management through the lifecycle of a component or family of multiple versions of a component.

The modelled components are made available to the community through their publication in the component library. The component library facilitates the versioning of the components. A user can adopt a component version into an application, and/or customize a particular version of a modelled component for use in an application. The component library allows for the submission of newly created and/or customized component versions. In some implementations, a component bridge and an update assimilator act as a bridge between the component library and component processor. These aspects of the platform are described further below.

Figure 4:
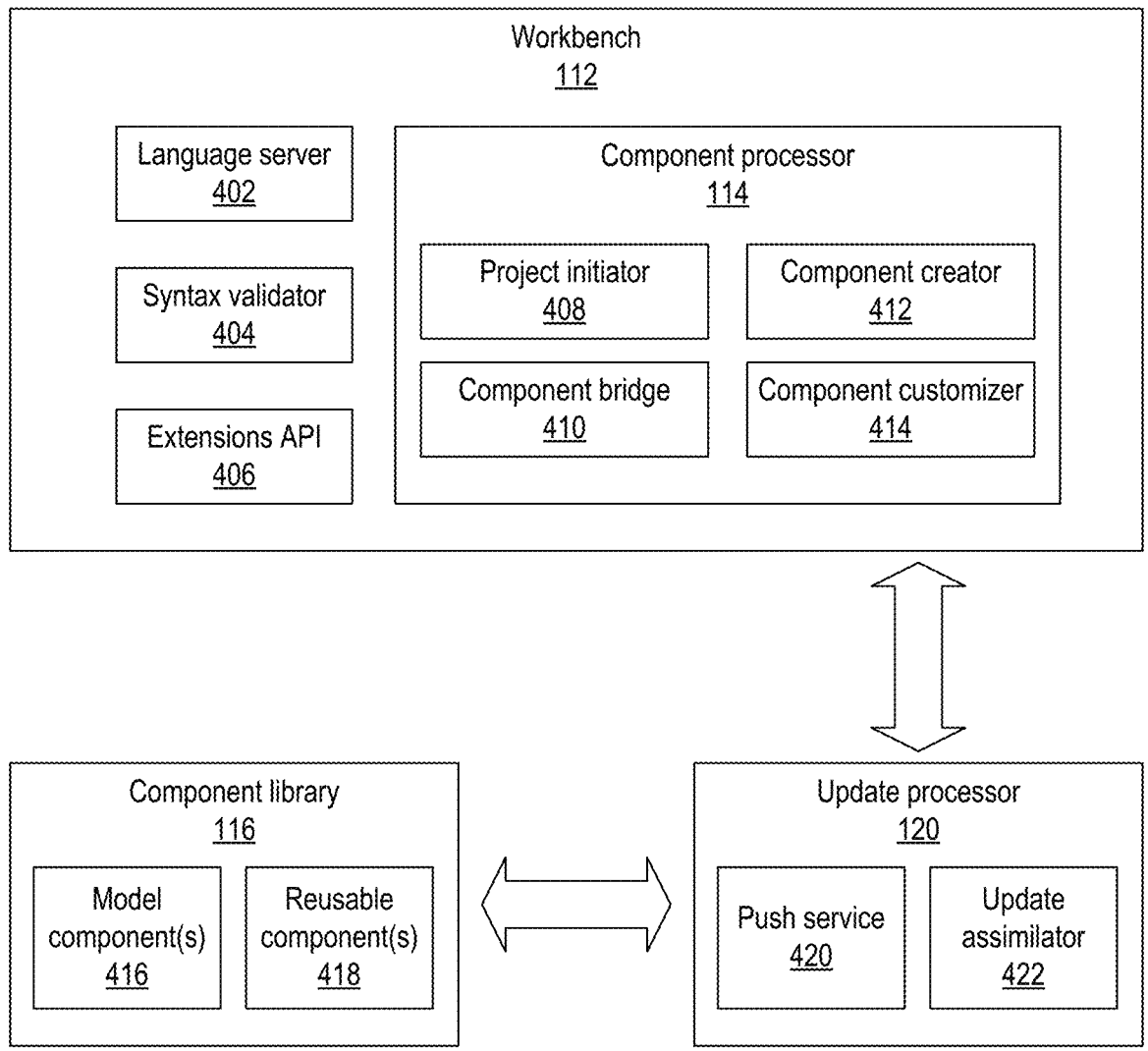
FIG. 4 is an example schematic of a workbench, component library, and update processor, according to implementations of the present disclosure.

FIG. 4 is an example schematic of a workbench 112, component library 116, and update processor 120, according to implementations of the present disclosure. As shown in the example of FIG. 4, the workbench 112 may include a language server 402, a syntax validator 404, and an extensions application programming interface (API) 406.

The workbench 112 may include the component processor 114, which may include a project initiator 408, a component bridge 410, a component creator 412, and a component customizer 414. The project initiator 408 may provide one or more quick starts that a user can use to create a new project and/or a new application within a project. As described above, a quick start can include a number of modelled components that are suitable for use within the application type corresponding to the quick start. The component bridge 410 provides a mechanism by which components are downloaded from the component library 116, through the update processor 120, for inclusion in an application. The component bridge 410 may also communicate with the update processor to upload modified versions of components and/or new components created within the workbench. The component creator 412 may enable the user to create a new component (e.g., not based on a modelled component). The component customizer may enable the user to modify a modelled component for use in their application.

In some implementations, the update processor 120 includes a push service 420 service 120 and an update assimilator 422. The update assimilator 422 may receive the new and/or updated component versions from the workbench 112, and perform various operations to store the new and/or updated component versions in the component library 116. Such operations may include versioning of the components, to determine whether a newly received component is an updated version of a modelled component or a new component. Operations may also include testing the newly received version for backward compatibility, in instances where the version is an update of a previous version of a modelled component. The push service may perform operations to update (e.g., auto-update) applications with new component versions, when new component versions are published in the component library 116.

The component library 116 can include model components 416 and/or reusable components 418. In some implementations, the update processor 120 acts as a bridge between the component library 116 and the workbench 112, to facilitate evolution and improvements to modelled components. The update processer which intermediates between the workbench 112 and the component library 116 facilitates the update mechanism described herein, and operates (through the push service) to push improved and/or updated component versions to users and/or applications. The push service may also send notifications to users to indicate that new component versions are available for components that the users have previously included in their applications.

In some implementations, the update assimilator includes a suggestion engine, a feedback engine, and a versioning engine. The feedback engine exercises work flow for improvements received to the modelled components. The suggestion engine operates to suggest project quick starts, modelled components and/or reusable components based on its learning over time and/or based on user-specified criteria, as described above. The versioning engine manages the component versions, and also maintains usage statistics for the various versions of the components (e.g., usage frequency, adoption frequency, etc.). In some instances, the versioning engine also manages the receipt and recording of issues (e.g., bugs) reported for various versions of the various components.

Figure 5:
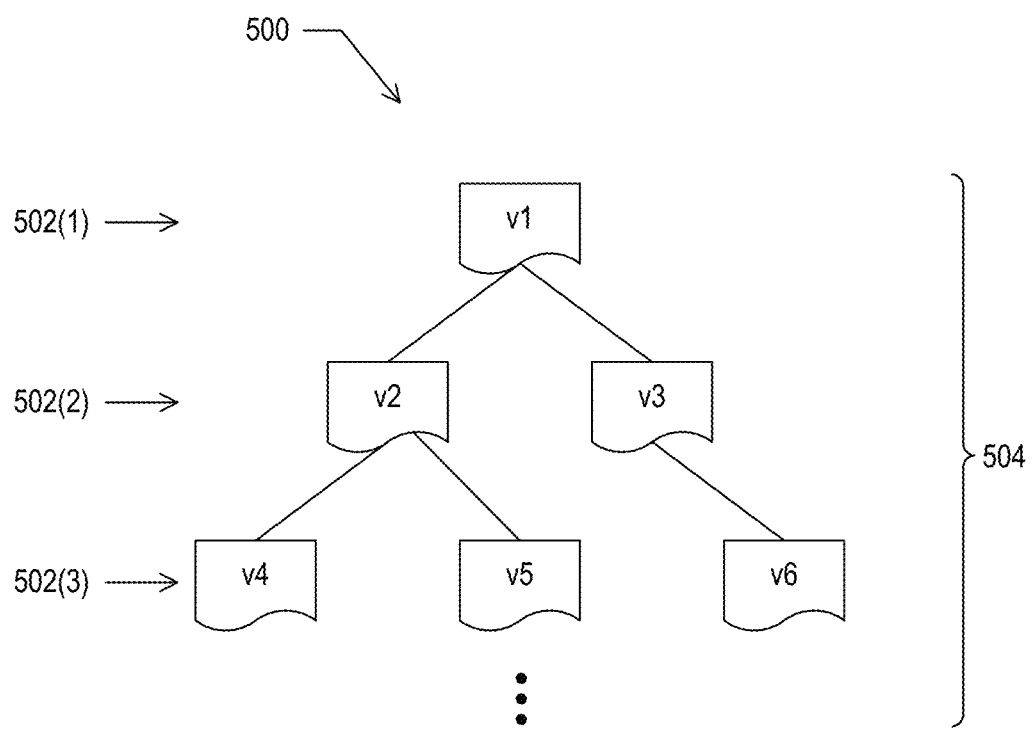
FIG. 5 is an example schematic showing a hierarchical tree of component versions, according to implementations of the present disclosure.

FIG. 5 is an example schematic showing a hierarchical tree 500 of component versions, according to implementations of the present disclosure. This example shows a set of component versions 504 for a particular modelled component. The versions may be described using a tree structure, as a hierarchy that includes any number of levels 502. In this example, a first version of the component (v1) has been modified twice to create v2 and v3 respectively. Such modifications may be made by different users or by a same user. The original (root) version v1 is at a first level 502(1), and the first generation of modifications v2 and v3 are at a second level 502(2). The v2 component has been modified twice to create v4 and v5 respectively, and the v3 component has been modified once to create a v6 component. The v4, v5, and v6 components are within a second generation of modifications, at a third level 502(3). A hierarchical tree may have any appropriate number of levels for a particular component. The platform may use such a tree structure to track the various versions of a component that have been created within the user community. Each component within the ecosystem is represented by such a logical tree, and each version of a component is represented by a node in the tree.

In some implementations, the suggestion engine (and/or the update processor more generally) uses various criteria such as improvement gains, adoption statistics, issues reported, and/or other statistics regarding a component version, to calculate the weight of a version of the component, which may also be described as an importance of the version. The weight of each version of a component is computed relative to the weights of other versions in the tree, and the weight for each node can be determined recursively based on the criteria described above, and/or other criteria. An overall, combined weight of the version is calculated from the tree-based weight along with other (e.g., administrator-configured) parameters. The overall weight of a version may be used to recommend one or more suitable component versions for incorporation into an application.

In some implementations, the receipt of a modified component version proceeds according to the following process. A user may check out a component, from the component library, for customization and inclusion in an application. After the customization is complete, the new version (e.g., v1.1) of the component may be submitted for publication. Testing (e.g., regression tests) may be performed to check for backward compatibility. In some examples, such testing may use automated unit test cases and/or functional test cases. The new version may also be tested through acceptance checks to verify functionality of any newly added features. Based on the results of the testing, open issues and/or bugs are identified and measured. The new version v1.1 is published with a recorded overall weight, which is calculated based on the (e.g., positive) weight of features due to improvement gains, the (e.g., negative) weight based on any identified issues and/or bugs, and the (e.g., positive) weight that is determined based on adoption frequency statistics (e.g., popularity of the version within the community).

For each node in a tree representing version of a component, the tree-based weight is calculated as described below. Every feature weight, adoption rating weight, and bug/issue weight is measured on scale of 0 to N, where N can be any suitable number. A mean feature weight (MFW), indicating the positive weight of new features in the version, is calculated per Example Formula 1.

$$MFW = \frac{1}{n}\sum_{i=1}^{n} f_n \qquad \text{Example Formula 1}$$

A mean adoption weight (MAW), indicating the positive weight of adoption frequency of the version within the community, is calculated per Example Formula 2.

$$MAW = \frac{1}{n}\sum_{i=1}^{n} a_n \qquad \text{Example Formula 2}$$

A mean bugs weight (MBW), indicating the negative weight due to bugs and/or other issues present in the version, is calculated per Example Formula 3.

$$MBW = \frac{1}{n}\sum_{i=1}^{n} b_n \qquad \text{Example Formula 3}$$

The tree-based weight (TBW) is calculated per Example Formula 4.

$$TBW = \frac{(MFW + MAW)}{2} - MBW \qquad \text{Example Formula 4}$$

The overall weight of a version is calculated as the average of the tree-based weight and a weight that is calculated based on administrator-configured parameters. In some implementations, the MFW, MAW, MBW, and/or TBW may be driven by the community of component users. The administrator-configured parameters may provide moderators, reviewers, and/or others a way to influence and course correct the weight for a component in situations where the above calculated weighs may not be sufficient. Moderators and/or reviewers are individuals (e.g., experts) who can use the platform to monitor, check, and/or access components for improvement gains, and/or influence or guide the evolution of component(s).

The overall weight and the mean feature weight are also used to determine if a version of a component is a candidate for merger or deprecation, through comparison to the highest weighted component version in the version tree at the same level. This process is described further below with reference to FIG. 6.

Figure 6:
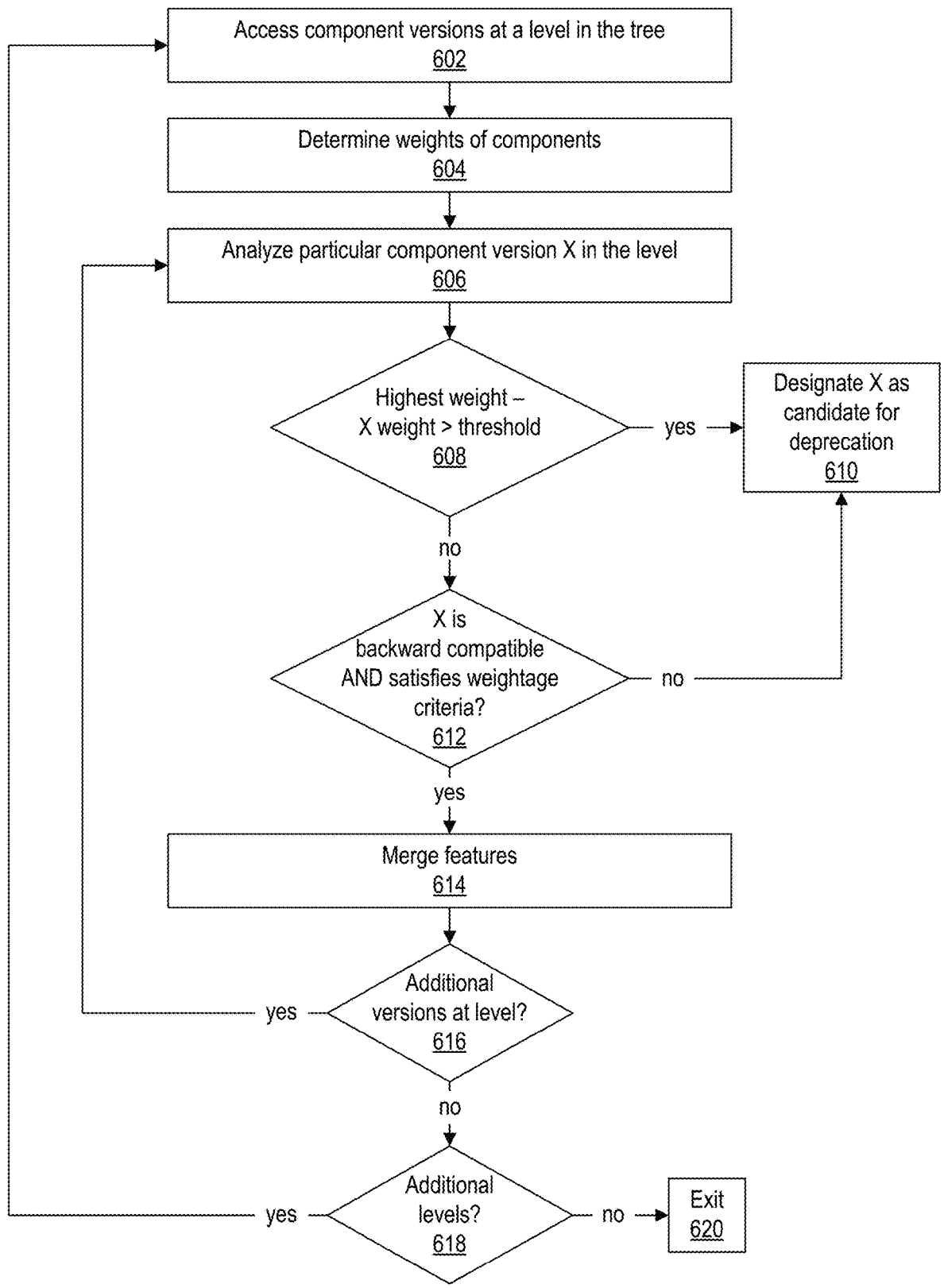
FIG. 6 depicts a flow diagram of an example process for maintaining a hierarchical tree of component versions, according to implementations of the present disclosure.

FIG. 6 depicts a flow diagram of an example process for maintaining a hierarchical tree of component versions, according to implementations of the present disclosure. Operations of the process can be performed by one or more of the user workspace 108, the workbench 112, the component processor 114, the update processor 120, and/or other software module(s) executing on the server computing device(s) 106, the user device 104, or elsewhere.

A tree structure corresponding to a particular component is accessed, and a first level of the tree is accessed for examination (602). The weights of each component version (e.g., each node) at the level are determined (604) as described above. A particular version X at the level is examined (606), and the difference between the overall weight of X and the overall weight of the highest weighted node in the level is determined. If the difference is greater than a pre-determined threshold value (608), version X is designated (610) as a candidate for deprecation.

If the difference is not greater than the threshold value, a determination is made (612) whether the version X passed its backward compatibility testing and the overall weight meets the various administrator-specified criteria. If not, version X is designated (610) as a candidate for deprecation). If both these criteria at (612) are satisfied, the version X is designated as a candidate for merger, and the features of version X are merged (614) with those of the highest weighted version at this level, to create a new merged version at this level. If (616) there are additional component versions to be examined at this level, the process returns to (608). If this level is complete, and if (618) there are additional levels of the tree to be analyzed, the process returns to (602) to analyze a next level. If there are no additional levels remaining, the process may exit (620).

This process may be described as tree shaking and/or tree pruning, and may cause the versions at a same level to be either merged or marked for deprecation to reduce the width of the level, and of the tree overall. Either outcome (merger and/or deprecation) results in a more feature-rich tree with a reduced width (breadth) at one or more levels. The tree for each component may be analyzed in this manner periodically to prevent the tree(s) from growing too broad, which would reduce the speed and/or efficiency of traversing the tree to identify component versions for recommendation to the user(s) in the community.

In some implementations, designating a component version as a candidate for deprecation includes adding a deprecation attribute to the metadata for a component version, along with version number and/or other types of metadata that describe the version. Versions marked for deprecation may be reviewed by an operator, to determine whether deprecation is to occur. In some implementations, the platform may issue a warning if an application is using deprecated component(s), and new adaptors may also be warned of the deprecation of a specific version if they choose to incorporate a deprecated component version into an application. A deprecated component can be rendered un-discoverable, through the platform, after a certain period of time has passed since the designation of deprecation, to avoid further adoption and/or customization of such a component version.

Figure 7:
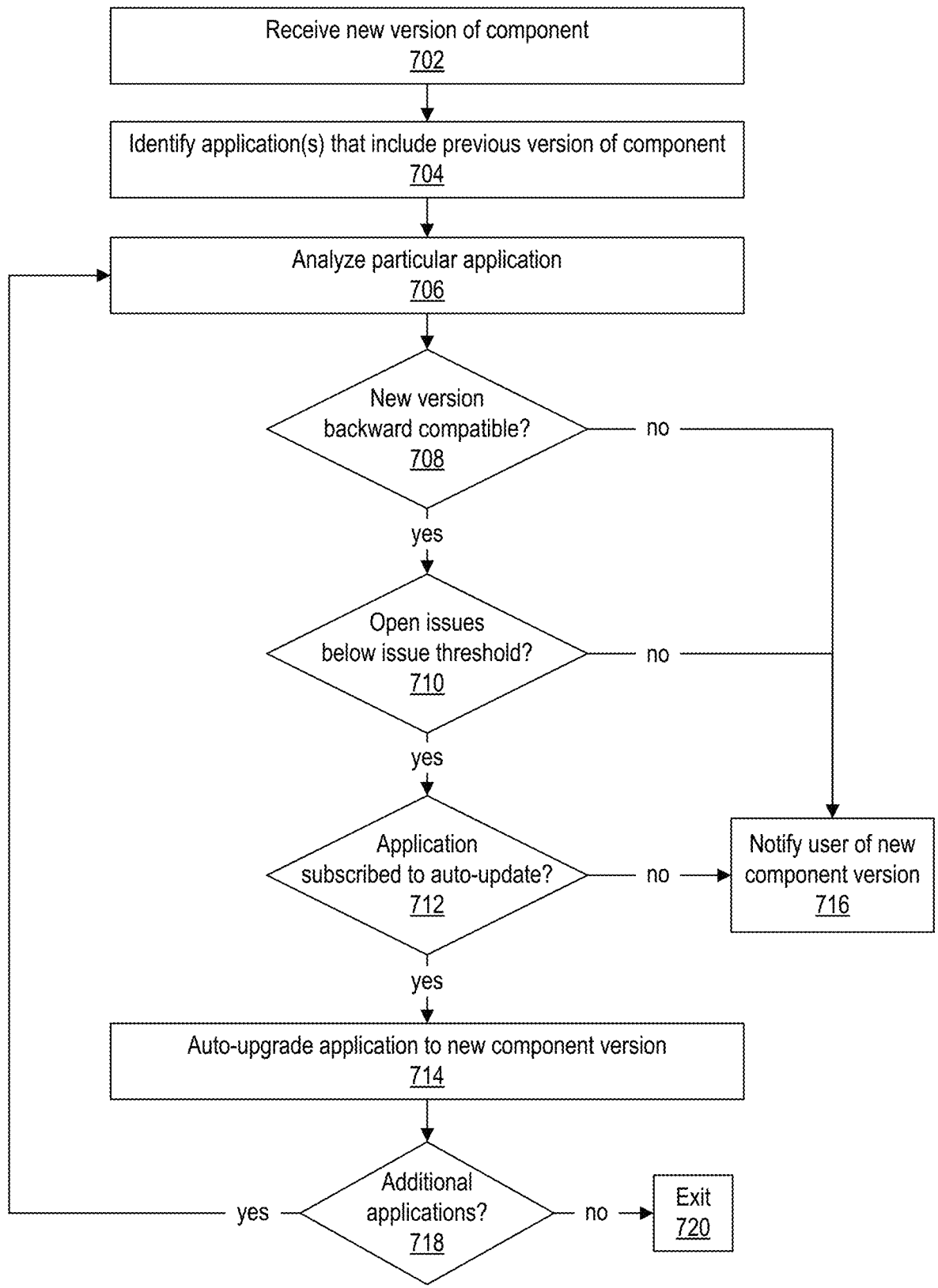
FIG. 7 depicts a flow diagram of an example process for updating applications with component versions, according to implementations of the present disclosure.

FIG. 7 depicts a flow diagram of an example process for updating applications with component versions, according to implementations of the present disclosure. Operations of the process can be performed by one or more of the user workspace 108, the workbench 112, the component processor 114, the update processor 120, and/or other software module(s) executing on the server computing device(s) 106, the user device 104, or elsewhere.

A new version of a component is received (702) as described above. In instances where the new version is an updated version of a modelled component that is currently tracked in the component library, the platform identifies (704) those application(s), if any, that include a previous version of the component. A particular one of those application(s) is analyzed (706). A determination is made (708), based on testing the new version, whether the new version is backward compatible with the old version. If so, a determination is made (710), based on testing the new version, whether any issues and/or bugs identified in the new version are below a threshold level of acceptable bugs or issues for auto-update. If either of these determinations are negative, i.e., if the new version is not backward compatible or if the new version includes bugs and/or issues that render it unsuitable for auto-update, a notification may be sent (716) to notify user(s) that a new component version is available in the component library. The notification may indicate that the new version breaks backward compatibility and/or includes the various bugs and/or issues identified through the testing. The notification may be sent to user(s) who own or are otherwise associated with the application, and may be sent using any suitable communications channel.

If the new version is backward compatible and does not include so many bugs and/or issues so as to be unsuitable for auto-update, a determination may be made (712) whether the particular application has been subscribed for auto-updates. Such a subscription may have been specified by the user who owns, or is otherwise associated with, the application. If auto-update is authorized for this application, the application may be auto-updated (714) (e.g., automatically upgraded) to include the new component version, replacing the previous version. If auto-update is not authorized for this application, the notification may be sent (716).

If (718) there are additional application(s) that include the previous version of the component, the process may return to (706) and analyze another application. If not, the process may exit (720).

In this way, a new version of a component can be automatically pushed into the application, or the user who owns the application can be notified that the new version is available for adoption. Backward compatibility can be determined based on automated functional test cases that test and certify various features of a component. In some implementations, the maximum open bugs/issues threshold may be based on various characteristics of the component, such as its features, complexity, and/or adoption frequency. In some implementations, when a workbench is launched by a user, this launch triggers a process to check whether new component versions are available. In such instances, for all components in use in applications in the user's workspace, a check is performed to determine if an updated version of the component has become available. If a new version is available for a component, the version is checked for upgrade suitability as described with respect to FIG. 7. If the new version is suitable for upgrade, the version is retrieved from the component library and pushed to the local workspace, replacing the previous version of the component in the workspace. If the new version is not suitable for auto-update, the user is notified that the new version is available for manual upgrade.

In some implementations, in addition to or instead of backward compatibility and/or quality determination (e.g., presence of bugs), various other characteristics of the more recent version of the component may be analyzed to determine whether the more recent version is suitable for auto-update (e.g., for those applications that have subscribed for auto-update). In some implementations, adoption statistics (e.g., adoption rates and/or frequencies) of the various versions of the components can be used as a threshold trigger for an upgrade of a component from an earlier version of the component. For example, applications may not be auto-upgraded to a new version of a component until a particular threshold number of applications are using the new version of the component (e.g., have been manually updated to include the new version). Such an adoption-based threshold for auto-update may provide a further check that the new version of the component is of sufficient quality and/or reliability before auto-updating other applications to include the new version.

Figure 8:
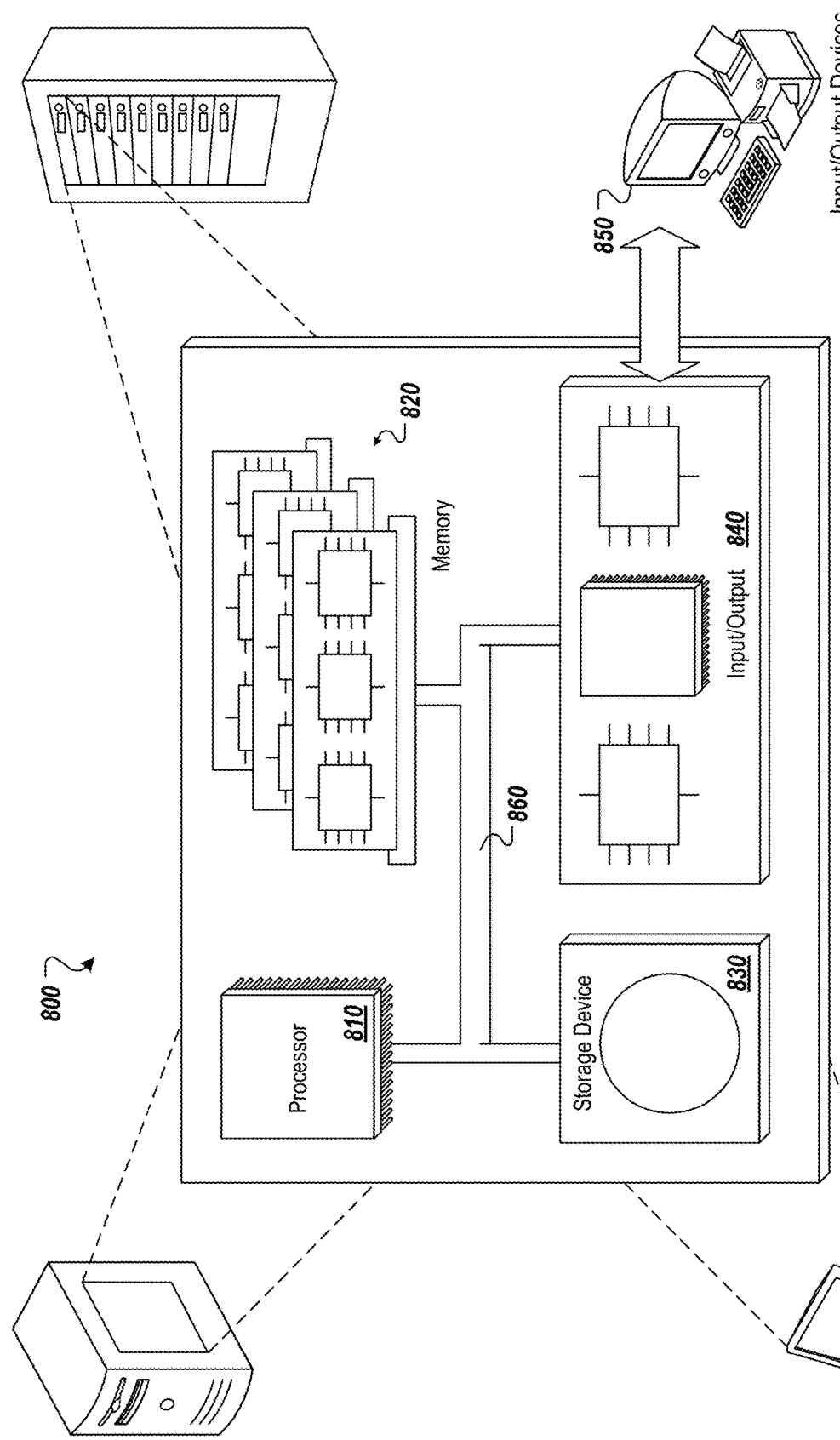
FIG. 8 depicts an example computing system, according to implementations of the present disclosure.

FIG. 8 depicts an example computing system 800, according to implementations of the present disclosure. The system 800 may be used for any of the operations described with respect to the various implementations discussed herein. For example, the system 800 may be included, at least in part, in one or more of the user device 104, the server computing device(s) 106, and/or other computing device(s) or system(s) described herein. The system 800 may include one or more processors 810, a memory 820, one or more storage devices 830, and one or more input/output (I/O) devices 850 controllable via one or more I/O interfaces 840. The various components 810, 820, 830, 840, or 850 may be interconnected via at least one system bus 860, which may enable the transfer of data between the various modules and components of the system 800.

The processor(s) 810 may be configured to process instructions for execution within the system 800. The processor(s) 810 may include single-threaded processor(s), multi-threaded processor(s), or both. The processor(s) 810 may be configured to process instructions stored in the memory 820 or on the storage device(s) 830. For example, the processor(s) 810 may execute instructions for the various software module(s) described herein. The processor(s) 810 may include hardware-based processor(s) each including one or more cores. The processor(s) 810 may include general purpose processor(s), special purpose processor(s), or both.

The memory 820 may store information within the system 800. In some implementations, the memory 820 includes one or more computer-readable media. The memory 820 may include any number of volatile memory units, any number of non-volatile memory units, or both volatile and non-volatile memory units. The memory 820 may include read-only memory, random access memory, or both. In some examples, the memory 820 may be employed as active or physical memory by one or more executing software modules.

The storage device(s) 830 may be configured to provide (e.g., persistent) mass storage for the system 800. In some implementations, the storage device(s) 830 may include one or more computer-readable media. For example, the storage device(s) 830 may include a floppy disk device, a hard disk device, an optical disk device, or a tape device. The storage device(s) 830 may include read-only memory, random access memory, or both. The storage device(s) 830 may include one or more of an internal hard drive, an external hard drive, or a removable drive.

One or both of the memory 820 or the storage device(s) 830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 800. In some implementations, the CRSM may include a data store that provides storage of computer-readable instructions or other information in a non-transitory format. The CRSM may be incorporated into the system 800 or may be external with respect to the system 800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 810 and the memory 820 may be supplemented by, or incorporated into, one or more application-specific integrated circuits (ASICs).

The system 800 may include one or more I/O devices 850. The I/O device(s) 850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 850 may also include one or more output devices such as a display, LED(s), an audio output device (e.g., a speaker), a printer, a haptic output device, and so forth. The I/O device(s) 850 may be physically incorporated in one or more computing devices of the system 800, or may be external with respect to one or more computing devices of the system 800.

The system 800 may include one or more I/O interfaces 840 to enable components or modules of the system 800 to control, interface with, or otherwise communicate with the I/O device(s) 850. The I/O interface(s) 840 may enable information to be transferred in or out of the system 800, or between components of the system 800, through serial communication, parallel communication, or other types of communication. For example, the I/O interface(s) 840 may comply with a version of the RS-232 standard for serial ports, or with a version of the IEEE 1284 standard for parallel ports. As another example, the I/O interface(s) 840 may be configured to provide a connection over Universal Serial Bus (USB) or Ethernet. In some examples, the I/O interface(s) 840 may be configured to provide a serial connection that is compliant with a version of the IEEE 1394 standard.

The I/O interface(s) 840 may also include one or more network interfaces that enable communications between computing devices in the system 800, or between the system 800 and other network-connected computing systems. The network interface(s) may include one or more network interface controllers (NICs) or other types of transceiver devices configured to send and receive communications over one or more communication networks using any network protocol.

Computing devices of the system 800 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

The invention claimed is:

1. A system comprising:
   at least one processor; and
   a memory communicatively coupled to the at least one processor, the memory storing instructions which, when executed by the at least one processor, cause the at least one processor to perform operations comprising:
   accessing, by a server-based workbench that supports a plurality of client-based workspaces that each provide a software development environment, a component library that stores at least one version of each of a plurality of software components that have been created by respective developers using the client-based workspaces;

publishing, by the server-based workbench, a first version of a particular software component from the component library to the plurality of workspaces that each provide the software development environment, the first version of the particular software component later being modified by a particular developer associated with a particular workspace into a second version of the particular software component that is incorporated into at least one application that is created using the particular workspace;

after the first version of the particular software component is modified by the particular developer into the second version of the particular software component using the particular workspace, receiving, by the server-based workbench and from the particular workspace, the second version of the software component that was modified by the particular developer; and performing at least one test to verify that the second version of the particular software component that was modified by the particular developer is backward compatible with the first version of the particular software component and, based on verifying that the second version is backward compatible with the first version of the particular software component:

storing, by the server-based workbench, the second version of the particular software component in the component library; and determining that a different developer of another existing application that incorporates the first version of the particular software component has opted in to automatic updates of software components that are incorporated into the another existing application, then (i) sending a notification of an availability of the second version of the particular software comment to other software developers that have not opted in to automatic updates of software components, and (ii) publishing, by the server-based workbench, the second version of the particular software component from the component library to a respective workspace that provides the software development environment for automatically updating the another existing application that incorporates the first version of the particular software component to incorporate the second version of the particular software component, without first sending a notification of an of the availability of the second version of the particular software component to the different developer.

2. The system of claim 1, wherein publishing the second version includes:
automatically updating the at least one application to include the second version, based at least partly on determining that the at least one application is registered to receive updates to the software component.

3. The system of claim 1, wherein publishing the second version includes:
automatically updating the at least one application to include the second version, based at least partly on determining that at least a threshold number of applications have been updated to include the second version.

4. The system of claim 1, wherein publishing a first version includes providing, for presentation in the plurality of workspaces, an adoption statistic that indicates a number of applications that have been previously created in the plurality of workspaces to include the first version of the software component.

5. The system of claim 1, wherein, the notification sent to the other software developers describes the at least one modification made to the first version to generate the second version.

6. The system of claim 1, the operations further comprising:
creating a tree structure that stores information describing available versions of the software component, including the first version and the second version, wherein the tree structure includes a plurality of nodes that each corresponds to a respective version of the software component.

7. The system of claim 6, the operations further comprising:
reducing a width of the tree structure based at least partly on a relative weight of the at least two available versions.

8. The system of claim 6, the operations further comprising:
reducing a width of the tree structure by indicating that at least one of the available versions of the software component is deprecated, based at least partly on a relative weight of the at least one available version compared to other available versions of the software component.

9. A computer-implemented method performed by at least one processor, the method comprising:
accessing, by a server-based workbench that supports a plurality of client-based workspaces that each provide a software development environment, a component library that stores at least one version of each of a plurality of software components that have been created by respective developers using the client-based workspaces;

publishing, by the server-based workbench, a first version of a particular software component from the component library to the plurality of workspaces that each provide the software development environment, the first version of the particular software component later being modified by a particular developer associated with a particular workspace into a second version of the particular software component that is incorporated into at least one application that is created using the particular workspace;

after the first version of the particular software component is modified by the particular developer into the second version of the particular software component using the particular workspace, receiving, by the server-based workbench and from the particular workspace, the second version of the software component that was modified by the particular developer; and performing at least one test to verify that the second version of the particular software component that was modified by the particular developer is backward compatible with the first version of the particular software component and, based on verifying that the second version is backward compatible with the first version of the particular software component:

storing, by the server-based workbench, the second version of the particular software component in the component library; and determining that a different developer of another existing application that incorporates the first version of the particular software component has opted in to automatic updates of software components that are incorporated into the another existing application, then (i) sending a notification of an availability of the second version of the particular software comment to other software developers that have not opted in to automatic updates of software components, and (ii) publishing, by the server-based workbench, the second version of the particular software component from the component library to a respective workspace that provides the software development environment for automatically updating the another existing application that incorporates the first version of the particular software component to incorporate the second version of the particular software component, without first sending a notification of the availability of the second version of the particular software component to the different developer.

10. The method of claim 9, wherein publishing the second version includes:
automatically updating the at least one application to include the second version, based at least partly on determining that the at least one application is registered to receive updates to the software component.

11. The method of claim 9, wherein publishing the second version includes:
automatically updating the at least one application to include the second version, based at least partly on determining that at least a threshold number of applications have been updated to include the second version.

12. The method of claim 9, wherein publishing a first version includes providing, for presentation in the plurality of workspaces, an adoption statistic that indicates a number of applications that have been previously created in the plurality of workspaces to include the first version of the software component.

13. The method of claim 9, wherein, the notification sent to the other software developers describes the at least one modification made to the first version to generate the second version.

14. The method of claim 9, further comprising:
creating, by the at least one processor, a tree structure that stores information describing available versions of the software component, including the first version and the second version, wherein the tree structure includes a plurality of nodes that each corresponds to a respective version of the software component.

15. The method of claim 14, further comprising:
reducing, by the at least one processor, a width of the tree structure based at least partly on a relative weight of the at least two available versions.

16. The method of claim 14, further comprising:
reducing, by the at least one processor, a width of the tree structure by indicating that at least one of the available versions of the software component is deprecated, based at least partly on a relative weight of the at least one available version compared to other available versions of the software component.

17. One or more non-transitory, computer-readable storage media storing instructions which, when executed by at least one processor, cause the at least one processor to perform operations comprising:

accessing, by a server-based workbench that supports a plurality of client-based workspaces that each provide a software development environment, a component library that stores at least one version of each of a plurality of software components that have been created by respective developers using the client-based workspaces;

publishing, by the server-based workbench, a first version of a particular software component from the component library to the plurality of workspaces that each provide the software development environment, the first version of the particular software component later being modified by a particular developer associated with a particular workspace into a second version of the particular software component that is incorporated into at least one application that is created using the particular workspace;

after the first version of the particular software component is modified by the particular developer into the second version of the particular software component using the particular workspace, receiving, by the server-based workbench and from the particular workspace, the second version of the software component that was modified by the particular developer; and performing at least one test to verify that the second version of the particular software component that was modified by the particular developer is backward compatible with the first version of the particular software component and, based on verifying that the second version is backward compatible with the first version of the particular software component:
storing, by the server-based workbench, the second version of the particular software component in the component library; and
determining that a different developer of another existing application that incorporates the first version of the particular software component has opted in to automatic updates of software components that are incorporated into the another existing application, then (i) sending a notification of an availability of the second version of the particular software comment to other software developers that have not opted in to automatic updates of software components, and (ii) publishing, by the server-based workbench, the second version of the particular software component from the component library to a respective workspace that provides the software development environment for automatically updating the another existing application that incorporates the first version of the particular software component to incorporate the second version of the particular software component, without first sending a notification of the availability of the second version of the particular software component to the different developer.

18. The one or more computer-readable storage media of claim 17, wherein publishing the second version includes:
automatically updating the at least one application to include the second version, based at least partly on determining that at least a threshold number of applications have been updated to include the second version.

* * * * *

UNITED STATES PATENT AND TRADEMARK OFFICE
CERTIFICATE OF CORRECTION

PATENT NO.         : 10,503,495 B2
APPLICATION NO.    : 15/714282
DATED              : December 10, 2019
INVENTOR(S)        : Ashish Kolhe et al.

Page 1 of 1

It is certified that error appears in the above-identified patent and that said Letters Patent is hereby corrected as shown below:

In the Claims

In Claim 1, Column 19, Line 49, after "notification" delete "of an".

Signed and Sealed this
Fourth Day of February, 2020

Andrei Iancu
*Director of the United States Patent and Trademark Office*